(12) United States Patent
Li et al.

(10) Patent No.: US 11,313,411 B2
(45) Date of Patent: Apr. 26, 2022

(54) FOLDING DEVICE

(71) Applicant: DAHON TECHNOLOGIES. LTD, Shenzhen (CN)

(72) Inventors: Jinzhong Li, Shenzhen (CN); David Tak Wei Hon, Shenzhen (CN)

(73) Assignee: DAHON TECHNOLOGIES. LTD, Shenzhen (CN)

( * ) Notice: Subject to any disclaimer, the term of this patent is extended or adjusted under 35 U.S.C. 154(b) by 187 days.

(21) Appl. No.: 16/491,166

(22) PCT Filed: Nov. 21, 2017

(86) PCT No.: PCT/CN2017/112046
§ 371 (c)(1),
(2) Date: Sep. 5, 2019

(87) PCT Pub. No.: WO2018/171232
PCT Pub. Date: Sep. 27, 2018

(65) Prior Publication Data
US 2019/0390708 A1    Dec. 26, 2019

(30) Foreign Application Priority Data

Mar. 22, 2017 (CN) .................. 201720283486.3

(51) Int. Cl.
*F16C 11/10*     (2006.01)
*F16C 11/04*     (2006.01)
*B62K 15/00*     (2006.01)

(52) U.S. Cl.
CPC ............ *F16C 11/103* (2013.01); *F16C 11/04* (2013.01); *B62K 15/006* (2013.01)

(58) Field of Classification Search
CPC ..... Y10T 403/32861; Y10T 403/32409; Y10T 403/7045; B62K 15/006; B62K 15/008
(Continued)

(56) References Cited

U.S. PATENT DOCUMENTS 5,337,609 A * 8/1994 Hsu ................. F16B 7/0406
                                                74/551.3
5,440,948 A * 8/1995 Cheng ............. B62K 15/006
                                                280/278

(Continued)

FOREIGN PATENT DOCUMENTS

CN    201350940 Y  * 11/2009
CN    201350940 Y    11/2009
(Continued)

*Primary Examiner* — Daniel J Wiley
(74) *Attorney, Agent, or Firm* — Bayramoglu Law Offices LLC (57) ABSTRACT

A folding device for folding or disassembling rigid objects is provided with engaged toothed rows on opposing surfaces of two connecting plates. Opposite surfaces of protruded teeth of the toothed rows are provided with toothed grooves meshing with each other. When a locking mechanism perpendicular to a direction of the toothed rows is locked, the two connecting plates are driven by the locking mechanism to move toward each other in opposite directions along a pulling rod, so that the toothed grooves on the toothed rows tightly engage with one another, and the two connecting plates are pressed tightly and fixedly connected. When the folding device is in a connected state, meshing surfaces of the two connecting plates tightly mesh with each other through the corresponding toothed grooves, so that the two connected parts are combined together to form a whole rigid combination.

5 Claims, 10 Drawing Sheets

(58) Field of Classification Search
USPC ......................................................... 403/102
See application file for complete search history.

(56) References Cited

U.S. PATENT DOCUMENTS

| | | | | |
|---|---|---|---|---|
| 5,906,452 | A * | 5/1999 | Lee | B62K 15/006 403/325 |
| 5,938,223 | A * | 8/1999 | Kotlier | B62K 13/02 280/204 |
| 6,523,223 | B2 * | 2/2003 | Wang | B62K 15/006 16/319 |
| 6,739,421 | B1 * | 5/2004 | Miya | B62K 15/006 180/206.1 |
| 6,827,518 | B2 * | 12/2004 | Hon | B62K 15/006 16/324 |
| 7,029,197 | B2 * | 4/2006 | Lin | F16B 2/185 285/70 |
| 7,464,849 | B2 * | 12/2008 | Shelton, IV | A61B 17/07207 227/175.1 |
| 7,591,473 | B2 * | 9/2009 | Tak-Wei Hon | B62K 15/008 280/278 |
| 9,371,108 | B2 * | 6/2016 | Betti | B62K 15/006 |
| 2003/0114274 | A1 | 6/2003 | Chang | |
| 2009/0317178 | A1 * | 12/2009 | Wang | B62K 15/006 403/150 |
| 2010/0135715 | A1 * | 6/2010 | Huang | B62K 15/006 403/83 |

FOREIGN PATENT DOCUMENTS

| | | | |
|---|---|---|---|
| CN | 201405982 Y | | 2/2010 |
| CN | 202144288 U | * | 2/2012 |
| CN | 102530158 A | | 7/2012 |
| CN | 202670018 U | | 1/2013 |
| CN | 203450283 U | * | 2/2014 |
| CN | 203528696 U | * | 4/2014 |
| CN | 204567867 U | * | 8/2015 |
| CN | 107054536 A | | 8/2017 |
| GB | 578384 A | * | 6/1946 ........... B62K 15/006 |

* cited by examiner

PRIOR ART

FOLDING DEVICE

CROSS REFERENCE TO THE RELATED APPLICATIONS

This application is the national phase entry of International Application No. PCT/CN2017/112046, filed on Nov. 21, 2017, which is based upon and claims priority to Chinese Patent Application No. 201720283486.3, filed on Mar. 22, 2017, the entire contents of which are incorporated herein by reference.

TECHNICAL FIELD

The present disclosure relates to a folding device structure for folding rigid objects.

BACKGROUND

Figure 17:
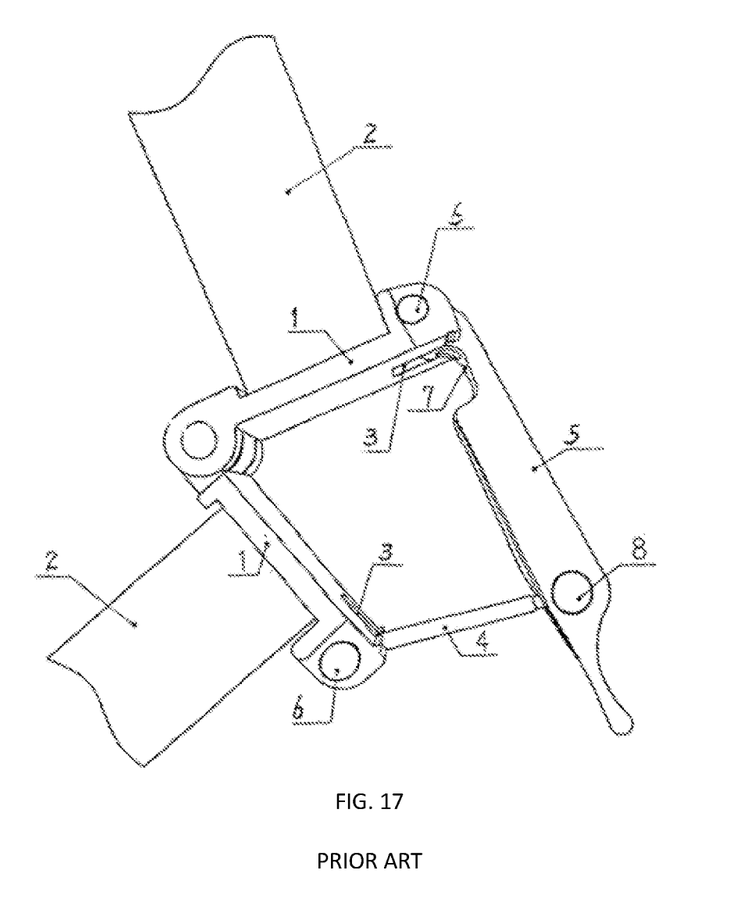
FIG. 17 is a perspective schematic diagram showing a product according to the prior art.

In order to enhance portability, foldable or detachable structures are used or desired to be used in various products. Currently, foldable bicycles have gained about 10% market share of all bicycle sales and are still fast-growing. Among most of the foldable products, original connection tubes are folded often through a folding device, by hinging the same edge of two opposite plates and locking another edge of the opposite plates through a locking mechanism, which achieves switching between an unfolded state and a folded state by unlocking and locking the locking mechanism. An oldest and most common four-bar linkage shown in FIG. 17 and other similar structures are used in other foldable products including, but not limited to, electric bicycles, tricycles, scooters, camping gears, and military hardware.

The above-mentioned device has been around for a long time, and are very common, but the usage effect is unsatisfactory. The overall strength of a folding connector only relies on a hinge and a bolt, while a strong stress concentration exists at a connector of the product during use, so the product has a safety hazard at the connection portion. In fact, most of the foldable bicycles available on the current market failed to pass a safety standard test for bicycles, which caused many product tort liabilities and public safety issues. In order to improve a strain condition of the structure, a firm, durable, and sustainably stable folding device with a completely different technical design principle should be proposed to ensure an excellent combination of a front part and a rear part of the foldable component.

SUMMARY

It is an objective of the present disclosure to provide a folding device having a simpler structure and a higher strength.

A folding device according to the present disclosure includes two opposite connecting plates. Opposite surfaces of the two connecting plates are both provided with at least one set of protruded teeth to form two toothed rows meshing with each other. Meshing surfaces of the two toothed rows are oppositely provided with first toothed grooves and second toothed grooves meshing with each other. A pull rod simultaneously penetrating through the toothed rows of the two connecting plates is provided in a direction perpendicular to the toothed rows. An end of the pull rod is provided with a locking mechanism. When the two connecting plates are folded together, the toothed grooves on the two toothed rows tightly mesh with each other by locking the locking mechanism, so as to tightly press and fixedly connect the two connecting plates.

The two connecting plates of the folding device according to the present disclosure mesh with each other through the toothed rows. The meshing surfaces are provided with the toothed grooves meshing with each other. The two connecting plates are pulled by the pull rod to move toward each other, so that the corresponding toothed grooves on the meshing surfaces tightly mesh with each other, to connect the two connecting plates. After the two connecting plates are connected, the opposite toothed grooves on the meshing surfaces planarly mesh with each other to connect a front part and a rear part to form an integrated and rigid combined body, which can stably and firmly connect the front part and the rear part and provide an alternative to the hinge and the bolt in the prior art. Consequently, the problem of insufficient connection strength in the existing structure can be completely overcome, and the folding device has a simple structure and a high connection strength. Moreover, the connection portion is smooth without a distinct protrusion. When the folding device connects tubular components, a tubular shape of the connection portion can be maintained, which is smooth and has good aesthetics.

The locking mechanism includes a positioning nut at an end of the pull rod and an eccentric locking handle mechanism at the other end of the pull rod. The locking mechanism belongs to the prior art and is commonly applied to the technical field of folding connectors for bicycles.

A hinge is provided at one edge of the two connecting plates to form an openable structure by hinging the hinge. At that time, the hinge merely functions as a connector during folding, and does not impact on the connection strength. Therefore, in order to save the cost and reduce the weight, the relatively light hinge component may be chosen without affecting the connection strength and the rigidity.

A hinge shaft of the hinge may be parallel to the pull rod, or perpendicular to the pull rod.

The two connecting plates may be not hinged with each other. When the folding device is unfolded, the two connecting plates may be freely detached.

The pull rod is directly mounted on one of the two connecting plates in a direction perpendicular to the toothed rows and penetrates through the toothed rows. A position of the other one of the two connecting plate corresponding to the pull rod is provided with a U-shaped groove. When the connecting plates are folded, the pull rod is exactly located in the U-shaped groove to form a structure simultaneously penetrating through the two connecting plates.

The folding device may be provided with a compression spring between adjacent protruded teeth of the toothed rows or between the protruded tooth and an edge of the connecting plate, and the compression spring is sleeved on the pull rod. When the locking mechanism is unlocked, the two connecting plates, under the action of an elastic force of the compression spring, can generate a force opposite to a force generated in the course of folding to push the toothed rows and the engaged toothed grooves, and are separated from each other.

Alternatively, the compression spring compressed between the two toothed rows may be sleeved outside the hinge shaft of the two connecting plates. Likewise, the force opposite to the force generated in the course of folding can be offered for the two connecting plates, so as to push the toothed rows and the meshed toothed grooves to separate the two connecting plates from each other.

For the relative motion of the two connecting plates during separation, a hinge shaft hole of the connecting plate is preferably elliptic, so as to provide a space for movement when the two connecting plates are separated.

1. Front tube; 2, Rear tube; 3. Cam handle; 4. Pull rod; 5. Compression spring; 6. Shaft pin; 7. Front connector; 8. Rear connector; 9. Hinge shaft; 10. Rotary shaft; 11. Lower stand tube; 12. Spring; 13. Nut; 14. Stand tube; 15. First toothed groove; 16. Second toothed groove 17. Oblique nut; 18.U-shaped push rod. 19 Vehicle top. 20. Screw hole. 21. Tube; 22. Spacer plate; 23. Protruded tooth.

DETAILED DESCRIPTION OF THE EMBODIMENTS

Figure 1:
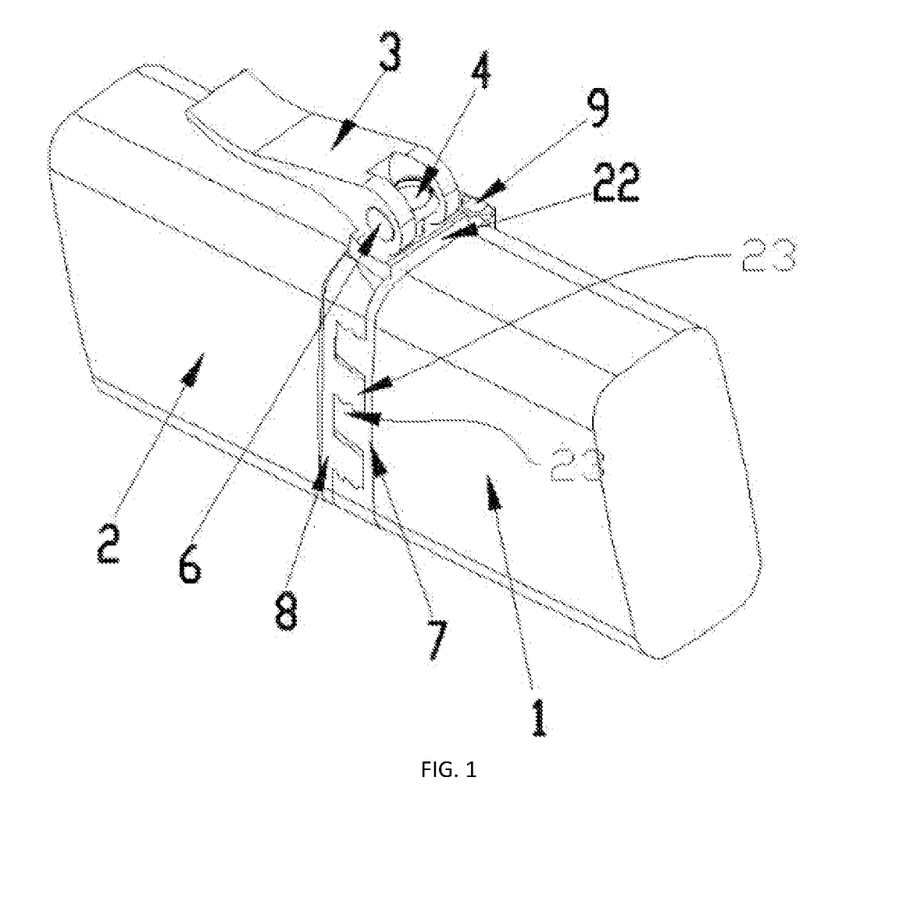
FIG. 1 is a perspective schematic diagram of the present disclosure.
Figure 2:
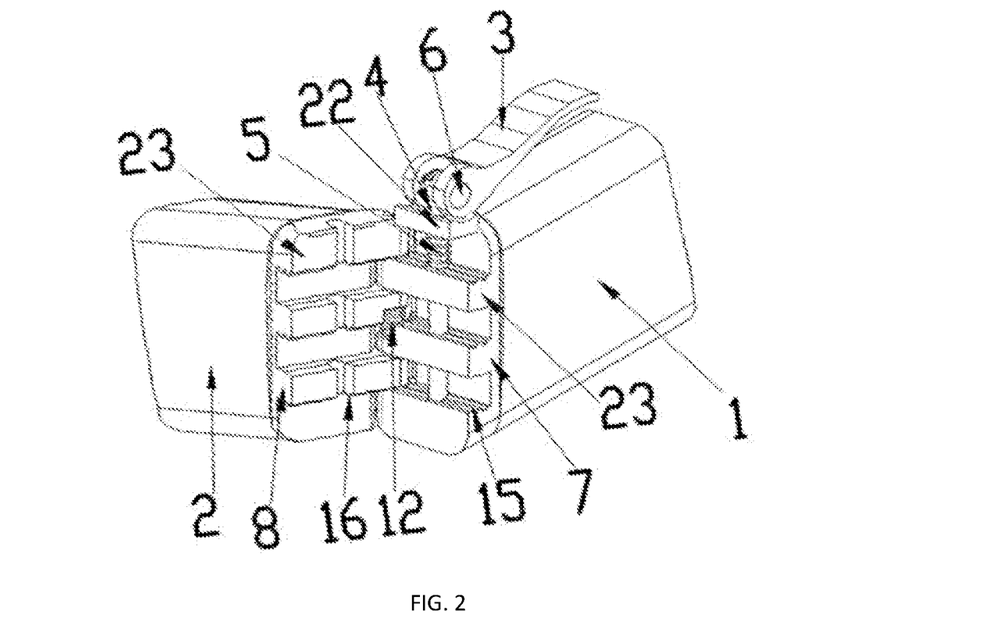
FIG. 2 is a perspective schematic diagram showing a hinge shaft is parallel to a pull rod.
Figure 4:
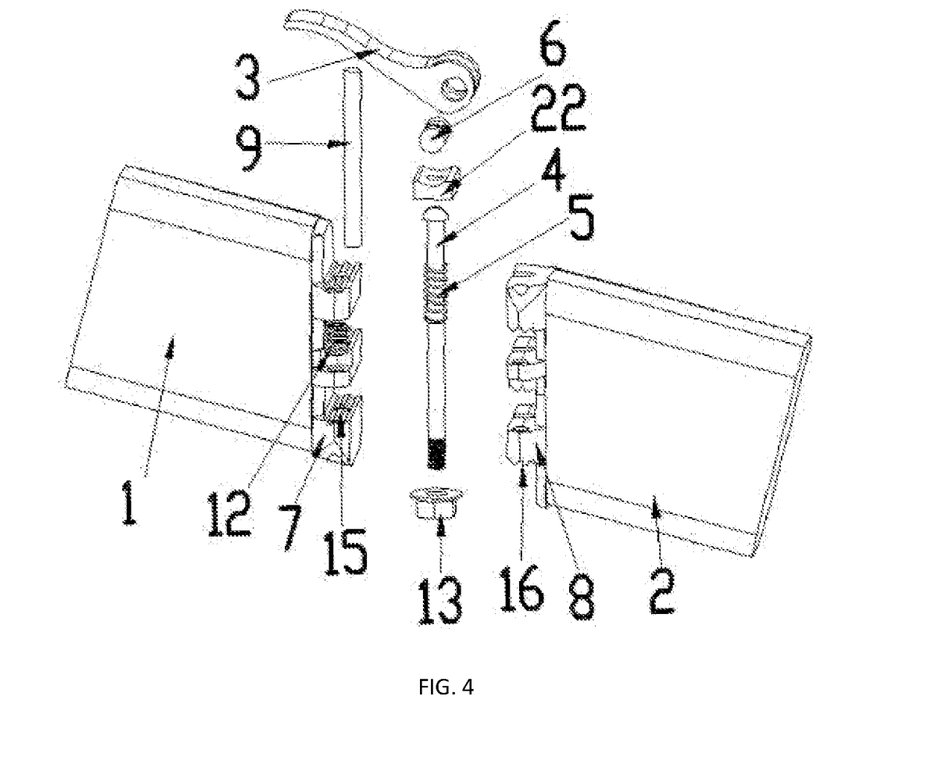
FIG. 4 is an exploded view of the present disclosure.
Figure 9:
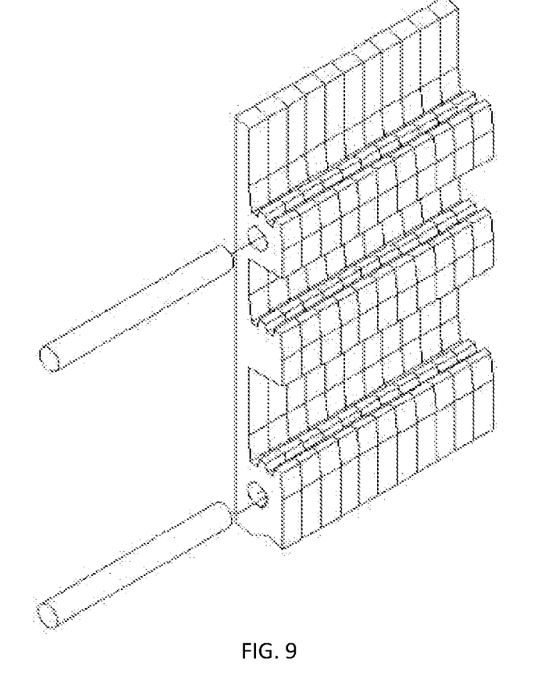
FIG. 9 is a perspective schematic diagram showing a connecting plate of the present disclosure.
Figure 10:
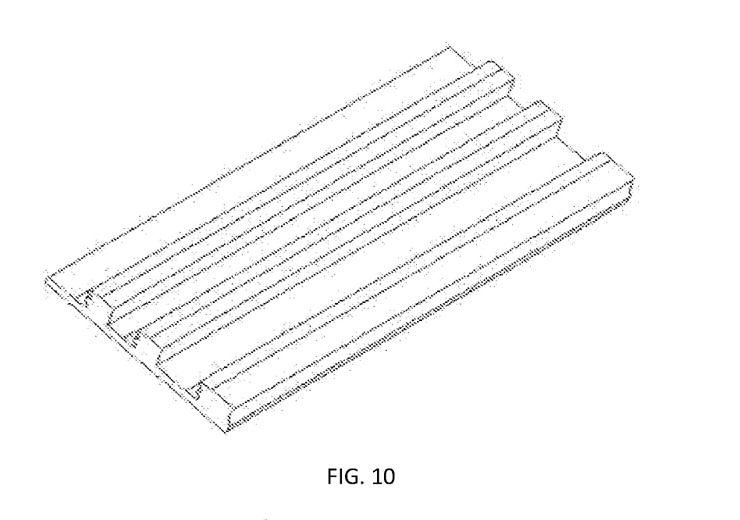
FIG. 10 is a perspective schematic diagram showing another connecting plate matching with the connecting plate in FIG. 9 of the present disclosure.
Figure 14:
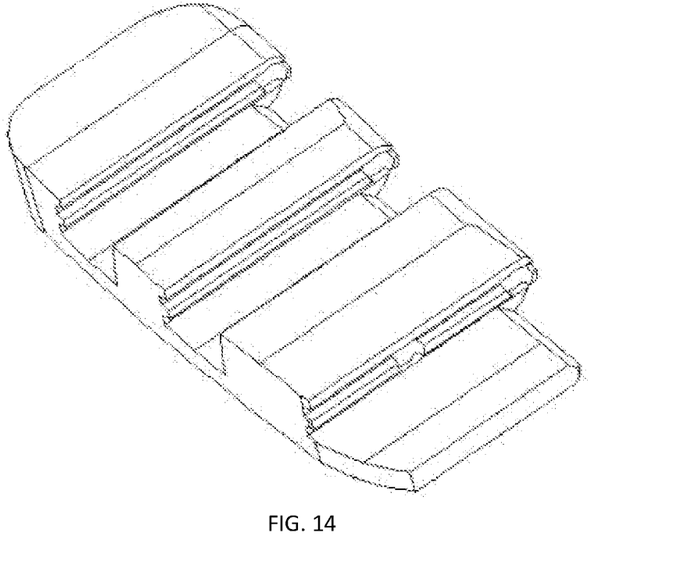
FIG. 14 is a perspective schematic diagram showing a connecting plate of the present disclosure.
Figure 15:
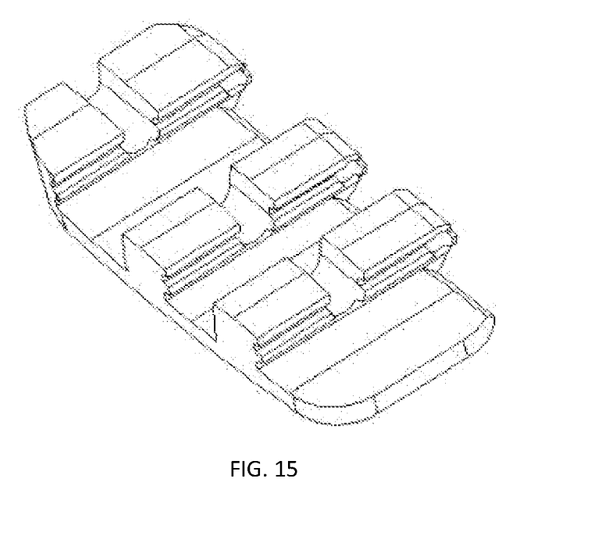
FIG. 15 is a perspective schematic diagram showing another connecting plate matching with the connecting plate in FIG. 14 of the present disclosure.
Figure 16:
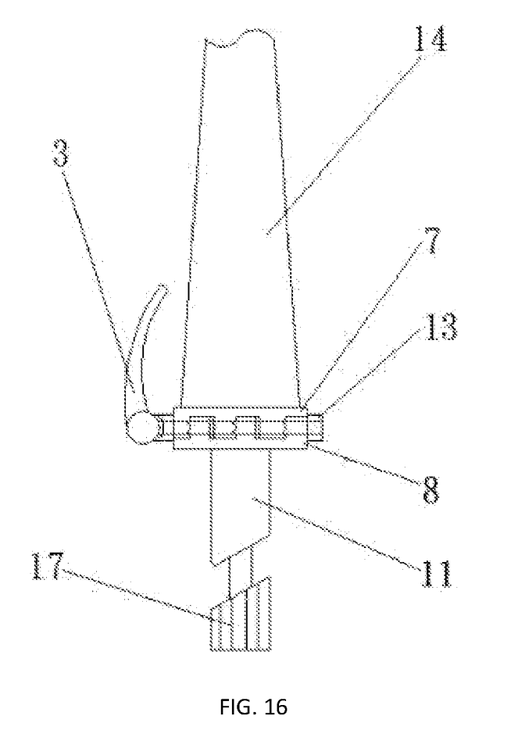
FIG. 16 is a perspective schematic diagram showing another embodiment of the present disclosure.

The folding device may be applied to folding bicycle frames. As shown in FIG. 1 and FIG. 2, a connecting plate is connected to the front tube 1. Another connecting plate is connected to the rear tube 2. The connecting plate connected to the front tube is referred to as the front connector 7, whose structure is shown in FIG. 9. The connecting plate connected to the rear tube is referred to as the rear connector 8, whose structure is shown in FIG. 10. An edge of the front connector and an edge of the rear connector are hinged through the hinge shaft 9. The opposite surfaces of the two connectors are provided with several sets of the protruded teeth 23 to form toothed rows. The toothed rows of the two connectors mesh with each other. The opposite surfaces having the toothed rows are provided with the first toothed groove 15 and the second toothed groove 16 which mesh with each other. As shown in FIG. 14, the front connector is provided with the pull rod 4 that is arranged in a direction perpendicular to the tooth rows and penetrates through the tooth rows of the front connector. A position of the rear connector corresponding to the pull rod is provided with a U-shaped groove, as shown in FIG. 15. When the rear connector and the front connector are folded together, the pull rod exactly fits with the U-shaped groove to form a structure penetrating through the two connecting plates simultaneously. An end of the pull rod is provided with a locking mechanism. The locking mechanism, as shown in FIG. 4, includes the positioning nut 13 and an eccentric locking handle mechanism respectively provided at two ends of the pull rod. A bottom end of the pull rod is positioned under the front connector through the positioning nut 13. The other end of the pull rod is provided with the eccentric locking handle mechanism. The eccentric locking handle mechanism includes the cam handle 3 hinged at the end of the pull rod through the shaft pin 6, the spacer plate 22 below the cam handle 3, and the compression spring 5 that is sleeved on the pull rod and provided between two protruded teeth of the toothed rows or between the protruded tooth and the edge of the connecting plate. When the two connecting plates are folded together, a part, having a larger diameter, of the cam handle faces downward by rotating the cam handle to press the compression spring and drive the front connector and the rear connector to move toward each other in the opposite directions, so that the toothed grooves on the surfaces with opposite toothed rows can be tightly meshed with each other to realize a stable connection of the two connectors. When the cam handle is operated to unlock, the compression spring can push the toothed rows and the meshed toothed grooves to make them separated from each other.

Figure 3:
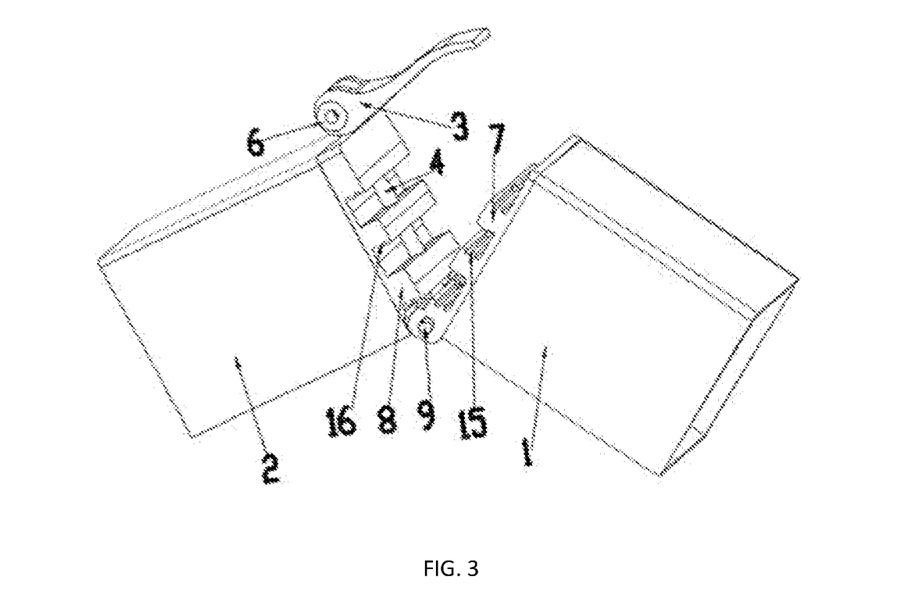
FIG. 3 is a perspective schematic diagram showing the hinge shaft is perpendicular to the pull rod.

Alternatively, the compression spring 12 compressed between two toothed rows is sleeved on the hinge shaft of the two connecting plates to supply the separating power for the compression spring, as shown in FIG. 3.

The two ends of the locking mechanism may both include nut structures. The bottom end of the pull rod is positioned below the front connector by the nut. A top end of the pull rod may be provided with the locking nut 13 screwed on the pull rod. By rotating the locking nut, the two connectors are driven to move toward each other in the opposite directions along the push rod, so that the toothed grooves mesh with each other to realize the stable connection of the two connectors.

Figure 11:
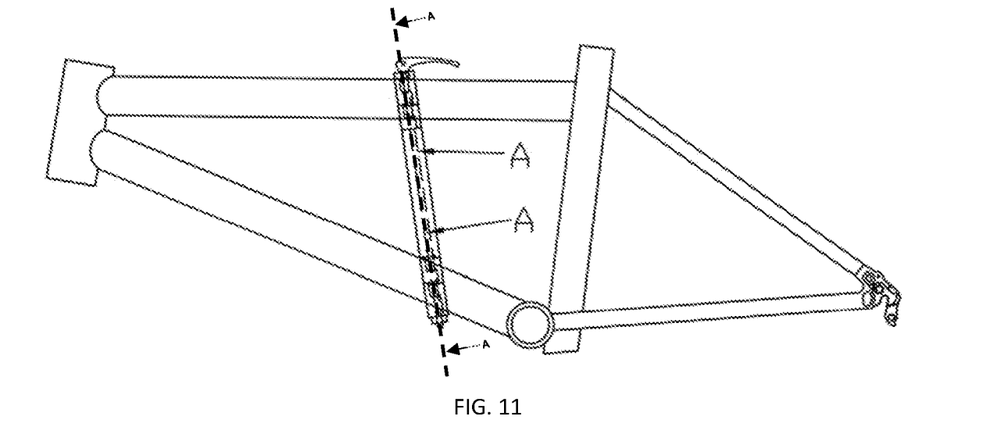
FIG. 11 is a perspective schematic diagram showing a connection between bicycle beam tubes.
Figure 12:
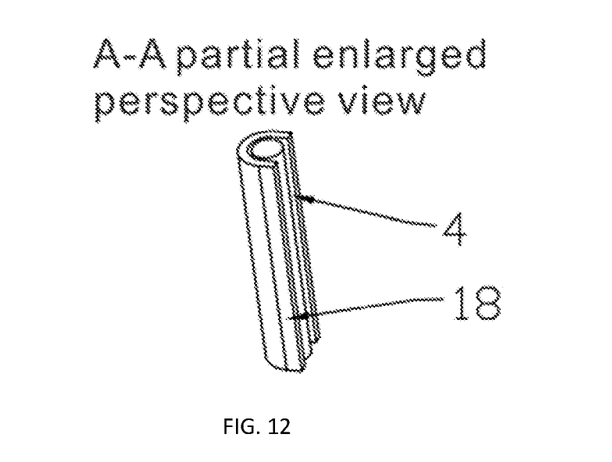
FIG. 12 is an A-A partial enlarged perspective view of FIG. 11.

The folding device is further applied to a plurality of tubes of a folding bicycle. As shown in FIG. 11, the folding device is applied to an upper bicycle beam tube and a lower bicycle beam tube to fold the two bicycle beam tubes at the same time.

The cam handle 3 may be mounted on the top or the bottom of the connector of the folding device.

As for the foldable bicycle, generally, the handle is welded on a foldable base. One of the connecting plates of the folding device functions as the handle base, and the other connecting plate is connected to the bicycle in a crossing manner, so as to realize an application to handlebars When the bicycle is provided with an upper tube and a lower tube, the upper tube and the lower tube are folded around the same axis. Two folding devices can be respectively mounted and configured to fold the tubes. Alternatively, the upper folding device and the lower folding device may be corresponding, and a U-shaped cross section is provided between the two folding devices to form continuous grooves on two connecting plates. The connectors can be connected by using one screw or the quick-acting cam handle 3. Specifically, the cam works on the U-shaped rod, and the portion between the connectors is fixed by the screw, as shown in FIG. 11.

Figure 5:
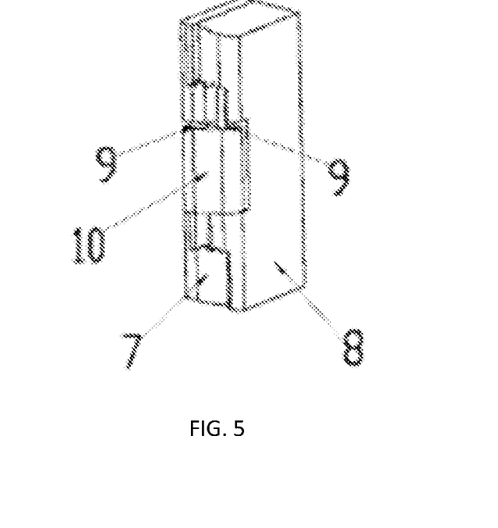
FIG. 5 is a perspective schematic diagram showing a connection between two connecting plates hinged with each other through two rotating shafts.
Figure 6:
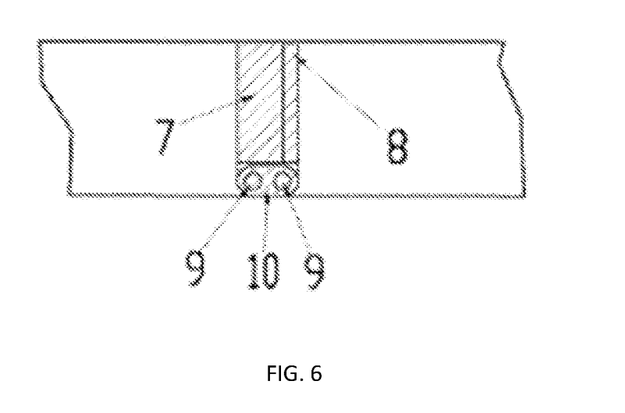
FIG. 6 is a sectional drawing showing a connection between two connecting plates hinged with each other through two rotating shafts.
Figure 7:
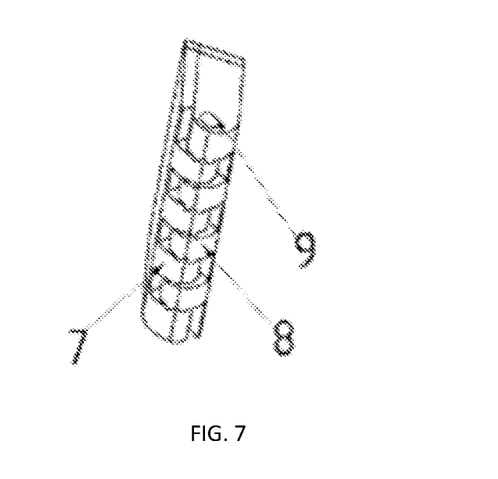
FIG. 7 is a perspective schematic diagram showing a connection between two connecting plates hinged with each other through a shaft.
Figure 8:
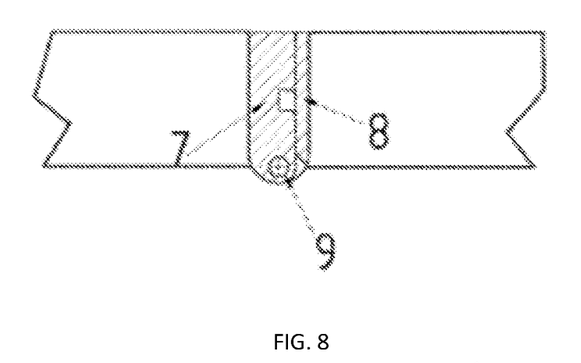
FIG. 8 is a sectional drawing showing a connection between two connecting plates hinged with each other through a shaft.

The two connecting plates may be hinged with each other through a shaft as shown in FIG. 1 and FIGS. 7-8. The two connecting plates may be hinged with each other through two rotating shafts as shown in FIGS. 5-6.

Figure 13:
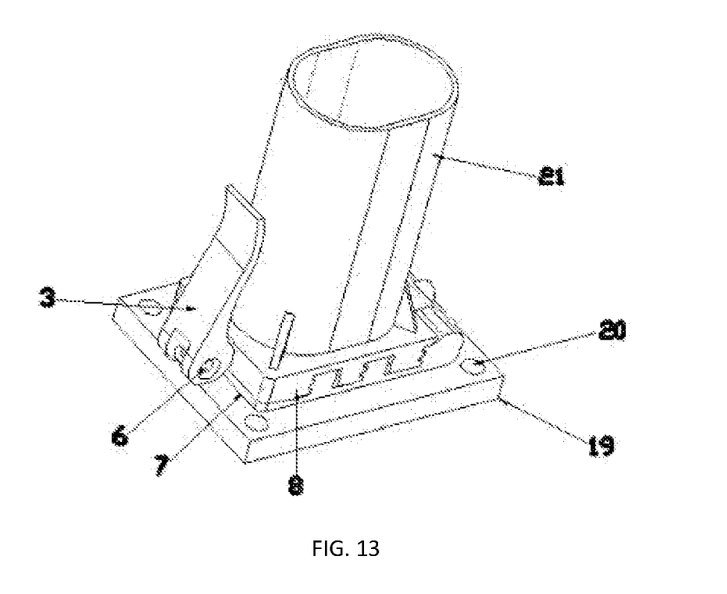
FIG. 13 is a perspective schematic diagram showing a structure of the two connecting plates without a hinge.

In some cases, the two connecting plates need to be separated rather than being folded together, which facilitates storage or transportation. A structure of the two connecting plates without the hinge can satisfy such requirements, as shown in FIG. 13. When the two connecting plates need to be folded together, the edges of the two connecting plates are hinged, which satisfies the requirements, as shown in FIGS. 1, 2, 3, and 4. The hinge shaft of the hinge may be parallel to the pull rod as shown in FIG. 1, or may be perpendicular to the pull rod as shown in FIG. 3.

The folding device of the present disclosure is further applied to the fields as follows. For instance, the temporary observation cameras may be mounted at a top of a retractable rod on a top of a scour vehicle or an exploration vehicle by utilizing the folding device. Generally, one of the two connecting plates will be tightly mounted on the vehicle, and the other one will be mounted at a bottom of the retractable rod. If a surface of the vehicle is made of steel, the connecting plate can be permanently connected to a quick-acting magnetic base.

What is claimed is:

1. A folding device, comprising: two connecting plates opposite to each other, wherein edges of the two connecting plates are hinged with each other via a hinge shaft, opposite surfaces of the two connecting plates are both provided with at least one set of protruded teeth to form two toothed rows meshing with each other; meshing surfaces of the two toothed rows are oppositely provided with first toothed grooves and second toothed grooves and the first toothed grooves and the second toothed grooves mesh with the toothed rows; a pull rod penetrating through the two toothed rows of the two connecting plates is arranged in a direction perpendicular to the toothed rows; an end portion of the pull rod is provided with a locking mechanism; when the two connecting plates are folded together, the first toothed grooves and the second toothed grooves on the two toothed rows tightly engage with each other by locking the locking mechanism to tightly fix and connect the two connecting plates; a compression spring that is sleeved on the hinge shaft wherein the compression spring is compressed between the two toothed rows; wherein, the hinge shaft configured to hinge the two connecting plates is parallel to the two toothed rows.

2. The folding device according to claim 1, wherein, the locking mechanism comprises a positioning nut at a first end of the pull rod and an eccentric locking handle mechanism at a second end of the pull rod.

3. The folding device according to claim 1, wherein, the pull rod is mounted on a first connecting plate of the two connecting plates and penetrates through the two toothed rows in the direction perpendicular to the toothed rows; a U-shaped groove is provided at a position of a second connecting plate of the two connecting plates corresponding to the pull rod; when the folding device is folded, the pull rod is exactly located inside the U-shaped groove to form a structure penetrating through the two connecting plates simultaneously.

4. The folding device according to claim 1, wherein, another compression spring is provided between adjacent protruded teeth of the two toothed rows or between the protruded tooth and an edge of the connecting plate, and is sleeved on the pull rod.

5. The folding device according to claim 1, wherein, a hinge shaft hole of the two connecting plates is elliptic.

\* \* \* \* \*